United States Patent [19]

Bass

[11] 3,928,075
[45] Dec. 23, 1975

[54] CONSUMABLE FUEL ELEMENT FOR BATTERY APPLICATIONS

[75] Inventor: Dieter Bass, Baie D'Urfe, Canada

[73] Assignee: Canada Wire and Cable Limited, Toronto, Canada

[22] Filed: July 15, 1974

[21] Appl. No.: 488,410

[30] Foreign Application Priority Data
June 21, 1974 Canada .............................. 203111

[52] U.S. Cl. ............................................ 136/100 R
[51] Int. Cl.² .......................................... H01M 13/00
[58] Field of Search... 136/100 R, 100 M, 83, 86 A, 136/86 D, 120 R, 120 FC, 114, 6 R, 20

[56] References Cited
UNITED STATES PATENTS

| | | | |
|---|---|---|---|
| 2,976,342 | 3/1961 | Morehouse et al. | 136/100 R |
| 3,368,958 | 2/1968 | Pryor et al. | 136/100 R X |
| 3,489,613 | 1/1970 | Trimmer et al. | 136/100 R X |
| 3,623,913 | 11/1971 | Adlhart et al. | 136/86 R |
| 3,657,017 | 4/1972 | Ketler, Jr. | 136/100 R |
| 3,730,776 | 5/1973 | Geisler, Jr. | 136/100 R |
| 3,791,871 | 2/1974 | Rowley | 136/100 R |

Primary Examiner—John H. Mack
Assistant Examiner—C. F. Lefevour
Attorney, Agent, or Firm—Fleit & Jacobson

[57] ABSTRACT

The fuel element comprises an alkali metal consumable anode of elongated shape and which is highly reactive with water, a consumable cathode in intimate contact with at least a portion of the surface of the anode and which corrodes in aqueous solutions of alkali metal hydroxide of pH higher than 9 which is formed by the electrochemical reaction of water with the alkali metal of the anode, and an insulating layer separating the anode from the cathode along the contact area of anode and cathode and which is capable of being dissolved in aqueous solutions of alkali metal hydroxide. The insulating layer is of a minimum thickness to insure intimate contact but no electrical short-circuit between the anode and the cathode. The thicknesses of the anode, cathode and insulating layer are selected to assure constant mean rate of consumption of all parts of the fuel element as long as the element is in contact with water. One end of the elongated fuel element is provided with two electric contacts, one to the anode and the other to the cathode for withdrawing electric energy from the fuel element and sealed. The opposite end of the fuel element is open so as to permit water to contact the alkali metal anode and so create and maintain the working environment of the fuel element.

17 Claims, 10 Drawing Figures

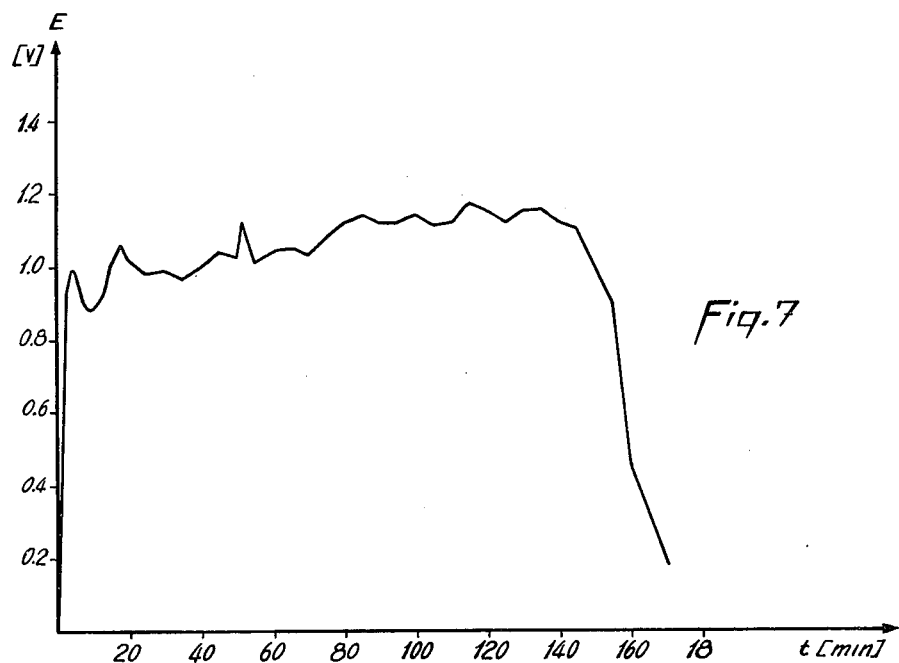
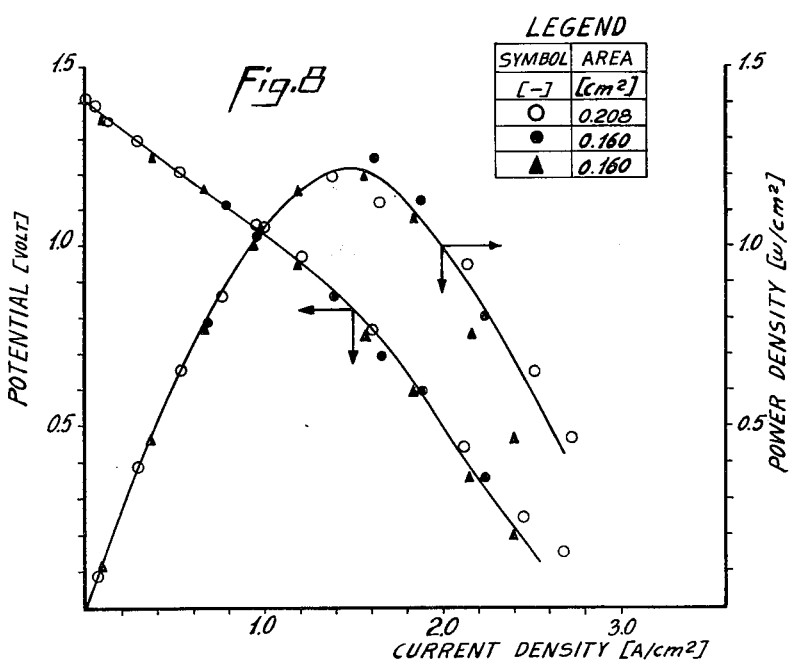

CONSUMABLE FUEL ELEMENT FOR BATTERY APPLICATIONS

This invention relates to a consumable fuel element for battery applications, and more particularly to a water activated fuel element using an alkali metal anode and a corrosive cathode.

The use of alkali metals as anode materials in aqueous electrolyte power cells has recently been disclosed in U.S. Pat. No. 3,791,871 issued Feb. 12, 1974. Such power cells are based on an accurate control of the concentration of the alkali metal hydroxide formed in the aqueous solution by the reaction of the alkali metal with water, as well as an accurate control of the temperature of the system. External monitoring and control of electrolyte composition and system temperature by a set of auxiliary equipment increase the complexity and the weight of such a power cell and reduce the net power gain. Such auxiliary equipment may be a necessity for very large power cells which constitute permanent installations, the alkali metal anodes being recharged intermittently. However, any low power application of the alkali metal-water battery concept would be severely handicapped by elaborate control devices.

It is therefore an object of the present invention to provide self-controlled electrochemical cells for low power applications and which permit the use of alkali metals as anodes in aqueous electrolytes. Applicant has found that no auxiliary equipment is required if such alkali metal anodes are combined with corroding metal cathodes in unique, composite structures, subsequently referred to as fuel elements.

Another object of the present invention is to provide means of incorporating such single fuel elements in complete multi-element batteries.

The fuel element, in accordance with the invention, comprises an alkali metal consumable anode, a consumable cathode in intimate contact with at least a portion of the surface of such anode and which corrodes in aqueous solutions of alkali metal hydroxide of a pH higher than 9 which is formed by the electrochemical reaction of water with the alkali metal of the anode, and an insulating layer separating the anode from the cathode along the contact area of anode and cathode and which is capable of being dissolved in aqueous solutions of alkali metal hydroxide. The insulating layer is of a minimum thickness to insure intimate contact but no electrical short-circuit between the anode and cathode. The thicknesses of the anode, cathode and insulating layer are selected to assure constant mean rate of consumption of all parts of the fuel element. One end of the fuel element is provided with two electric contacts, one to the anode and the other to the cathode for withdrawing electric energy from the fuel element and sealed. The opposite end of the fuel element is open so as to permit water to contact the alkali metal anode and so create and maintain the working environment of the fuel element as long as the element is in contact with water. During storage, a temporary seal may be placed on the open end of the fuel element to keep moisture from contacting the anode but the seal must be removed prior to immersion into water.

In a preferred embodiment of the invention, lithium is used as the anode material and aluminum or aluminum alloys are used as cathode materials. The thickness of the aluminum material may be in the range of 5 to 15 microns for an anode cross-sectional area ranging between 0.02 and 0.2 $cm^2$. When aluminum or aluminum alloys are used as cathode material, the insulating layer may be an oxide layer obtained by exposing aluminum to air. The thickness of the air-formed oxide layer on aluminum materials varies between 50 and 100 A. The thickness of the oxide layer may be increased by anodizing treatment up to one micron or more.

The anode may be in the shape of a cylindrical rod surrounded by a cathode shell of corrosive material such as aluminum or aluminum alloys. The anode may be in the shape of a thin strip surrounded with a cathode shell of corrosive material. The cathode may alternately be in the shape of a matrix of corrosive shell material forming a plurality of channels which are filled with consumable alkali metal anode material. The anode may, in another possible configuration, take the shape of a hollow tube, the inside of which is cladded with a cathode shell and the outside covered with an insoluble insulating layer which may be metallized on the side facing the anode. Alternately, the anode may take the shape of a plate, one side of which is cladded with a cathode sheet and the other side covered with an insoluble insulating sheet which may be metallized on the side facing the anode. Still another form of the fuel element may consist of a plurality of anode strips connected in parallel by a bridging member and separated by inert spacing strips. The composite plate is covered on both sides with a thin layer of cathode material. One of the covering layers may be a cathode sheet and the other an insoluble insulating sheet which may be metallized on the side facing the anode strips.

Plural fuel elements may be electrically connected in series or in parallel or both to make out a battery.

The invention will now be disclosed, by way of example, with reference to preferred embodiments illustrated in the accompanying drawings in which:

FIG. 7 illustrates the voltage changes during discharge of a composite fuel element in accordance with the invention;

FIG. 8 illustrates the combined polarization and power density curves of different composite fuel elements in accordance with the invention;

Figure 1:
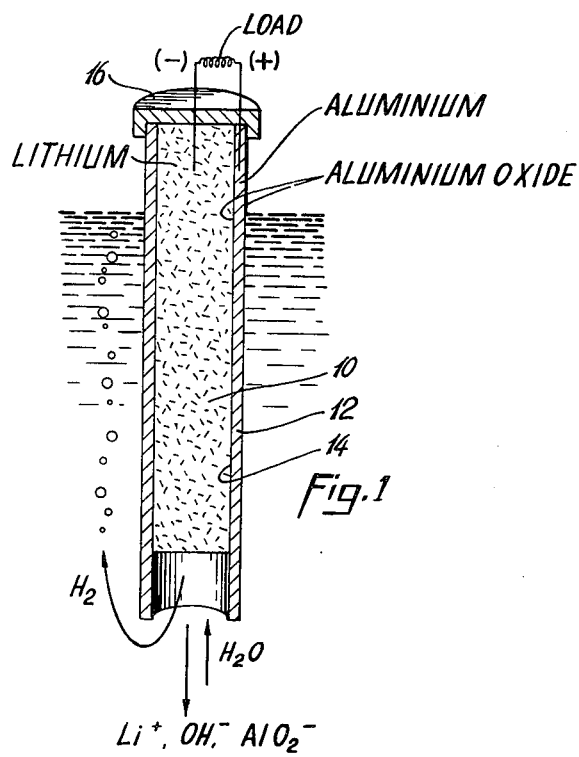
FIG. 1 illustrates a first embodiment of a fuel element in accordance with the invention.

Referring to FIG. 1, there is shown a fuel element consisting of an anode made in the shape of a cylindrical lithium rod 10 surrounded with a cathode in the shape of a shell 12 made of a metal which corrodes in aqueous solutions of lithium hydroxide, such as aluminum or aluminum alloys. An insulating layer 14, itself being capable of being dissolved in aqueous lithium hydroxide solutions, is interpositioned between the lithium rod 10 and the metal shell 12 in order to prevent internal short-circuits of the fuel element. In a preferred embodiment of the invention which incorporates aluminum or aluminum alloys as cathode material, such an insulating layer can be an oxide layer obtained by exposing aluminum to air, or grown directly on the cathode shell, e.g., by anodizing treatments. In the embodiment disclosed, electrical contacts are made to the anode and cathode at the upper end of the fuel element. This end is subsequently hermetically sealed as illustrated at 16 using standard sealing compounds such as two component casting resins which are inert to metallic lithium. The electrochemical reaction takes place at the lower end of the fuel element which is open so as to permit water to contact the anode and cathode. The above disclosed fuel element is water activated and must be in contact with water for operation. Any water may be used such as sea water, brackish water or fresh water. During storage, a temporary seal may be placed on the open end of the fuel element to keep moisture from contacting the anode but this seal must be removed so as to permit activation of the fuel element.

Upon contact of the fuel element with water, the following reactions take place.
 a. lithium ions go into solution at the anode,
 b. water is reduced to hydrogen and hydroxyl ions at the cathode, and
 c. local pH changes lead to dissolution of the insulating layer and corrosion of the cathode shell.

The above-identified U.S. Pat. No. 3,791,871 points out that some loss of anode efficiency will take place due to the direct reaction of the alkali metal with water. The anode is partially protected against this spontaneous reaction by a dynamically stable film of the alkali hydroxide which adheres to the metal surface under certain conditions. It is also generally known that the stability of such a film may be increased by the following mechanisms:
 1. increasing the lithium hydroxide concentration of electrolyte above 2N,
 2. decreasing the system temperature below 30°C,
 3. operating with high current density on the lithium anode,
 4. decreasing the mass transfer rates in the solution adjacent to the anode,
 5. decreasing the activity of the water in the electrolyte by dissolved additives.

Upon immersion into water, the anode material starts to be consumed. The cathode shell 12, as shown in FIG. 1, exceeds the length of the central anode by a small amount thus forming an inverted cup the bottom of which is shaped by that part of the anode surface that is exposed to the electrolyte. If the central anode has the same length as the cathode shell, the electrolyte will be identical to the surrounding water. The anode is therefore not protected and most of the free energy of the reaction of water with alkali metal is rapidly dissipated as heat (parasitic corrosion). The exposed anode surface retreats inside the cathode shell and the resulting cup formation leads to an increase in lithium hydroxide concentration in the solution inside the cup. Also, hydrogen gas which is evolved as a reaction product collects as a growing bubble inside the cup and escapes intermittently. The presence of a lithium hydroxide solution inside the inverted cup protects the anode against excessive parasitic corrosion and leads to corrosion of the aluminum shell. If the thicknesses of the central anode and surrounding aluminum shell are properly selected, both anode and cathode will be consumed at a constant and equal mean rate, so that constant power may be withdrawn from the electric contacts through an external load circuit as long as the fuel element is in contact with water. The fuel element is deactivated when removed from the aqueous solution and may be stored in a dry environment for future reactivation.

Those skilled in the art will realize that the present invention constitutes a unique and novel concept in primary cell design. Anode and cathode in such fuel elements are positioned side-by-side and only a small portion of the total surface of both electrodes is exposed to the electrolyte at any instance, whereas, in conventional cells, anode and cathode are positioned face to face with electrolyte filling the space between the electrodes. Alkali metals are particularly suited for such a design since they can and should be operated at very high current densities in aqueous electrolytes. It was found that aluminum and aluminum alloys that corrode appreciably in alkali metal hydroxide solutions of pH higher than 9 exhibit little polarization for the evolution of hydrogen in the same current density range appropriate for alkali metal anodes. Finally, the internal resistance of these fuel elements is minimized due to the close proximity of anode and cathode. Low internal resistance is important for high specific power of a battery system.

Another unique feature of such a water-activated alkali metal fuel element is the fact that the ionic species in the electrolyte are produced by its electrochemical reaction and must not be provided externally.

In addition, heat exchange to the surroundings is facilitated due to a very large ratio of metal surface area to volume of the element. The fuel elements may therefore be designed to operate at temperatures very close to ambient.

Figure 2:
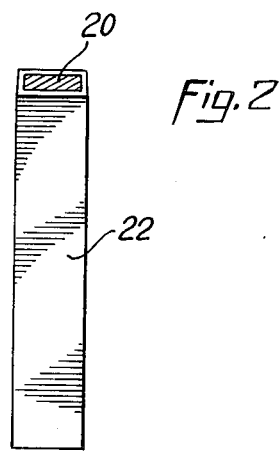
FIGS. 2 to 6 illustrate alternative embodiments of the invention.
Figure 3:
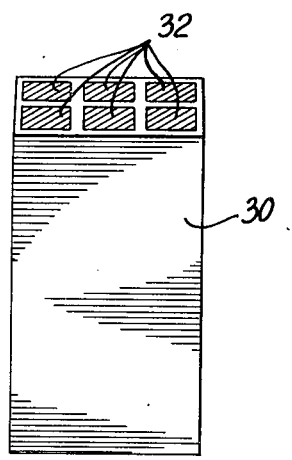
Figure 4:
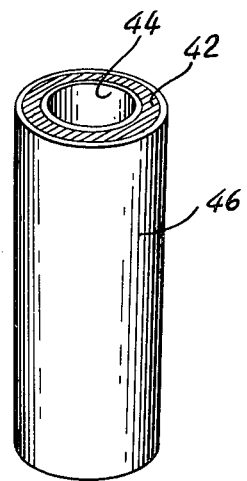
Figure 5:
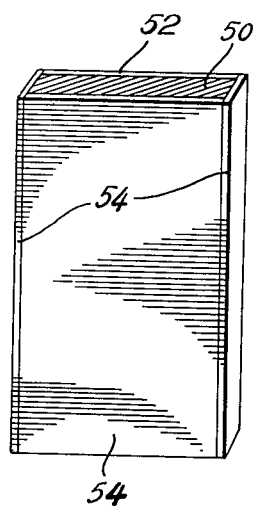
Figure 6:
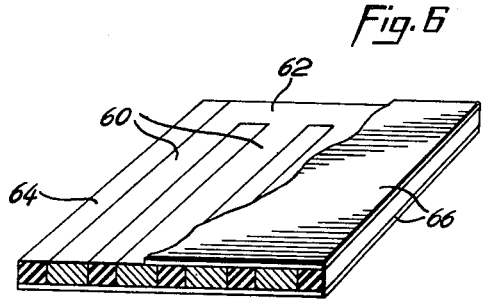

The physical shape of the above fuel element may vary considerably depending on specific requirements for practical applications. In the following example, the fuel elements are shown without electric contacts or external loads for simplification purposes. The fuel element may take the shape illustrated in FIG. 2 wherein the anode is a strip 20 surrounded by a shell 22 acting as a cathode. The cathode of the fuel element may also take the shape shown in FIG. 3 and consisting of matrix 30 forming a plurality of parallel channels which are filled with anode material 32. The anode of the fuel element could also have the form illustrated in FIG. 4 and consisting of a hollow tube 42 which is cladded, on the inside, with a cathode material 44 and covered, on the outside, with an insoluble insulating material 46 which may be metallized on the side facing the anode. The fuel element could, alternatively, take the shape shown in FIG. 5 and which consists of a plate 50 of anode material cladded, on one side, with a cathode sheet 52 and covered, on the other sides, with an insoluble insulating material 54 which may be metallized on the side facing the anode. Still another form of fuel element is illustrated in FIG. 6 of the drawings wherein the anode is made of a plurality of strips 60 connected in parallel by a bridging member 62 and separated by inert spacing strips 64. This composite plate is covered on both sides with a thin layer of cathode material 66. One of the covering layers may be an insoluble insulating material which may be metalized on the side facing the anode strips.

EXAMPLE I

Lithium rods of ⅛ inch diameter and up to 4 inches long were cladded with household quality aluminum foils as illustrated in FIG. 1. Electric contacts were made to anode and cathode at one end of the fuel rod and sealed using two component epoxy resin. A temporary seal was placed on the opposite end of the fuel rod and this assembly was immersed in saturated solutions of lithium hydroxide in distilled water to etch the aluminum shell. Different etching times were applied to study the influence of the thickness of the aluminum shell on the discharge characteristics of these fuel rods. E.g., 0.0008 inch foil was etched 0, 10, 15, 20 and 25 minutes to decrease the thickness from 0.0008 to 0.00053, to 0.0004, to 0.00027 and to 0.00013 inches respectively. The etched fuel rods were discharged in tap water at 25°C after the temporary seal had been removed. It was found that etching times between 15 minutes and 20 minutes produced minimum fluctuations in power output over the total lifetime of the fuel element. Under those conditions, typical mean rates of consumption were measured to be approximately 1 inch of rod length per hour and Coulomb efficiencies up to 30% have been obtained at energy densities of 250Whr/lb of lithium. If the thickness of the aluminum shell is too small, the rate of consumption increases at reduced Coulomb efficiencies. If the aluminum shell is too thick, the power output for the fuel element becomes unstable. This is caused by insufficient supply of reaction water to the electrolyte inside the inverted cup.

EXAMPLE II

Composite fuel plates were made according to FIG. 6 consisting of four identical lithium strips connected in parallel, separated by polyvinyl chloride strips and sandwiched between two layers of aluminum foil, the thickness of which was adjusted by the same etching treatment as above to 0.00035 inches. Each lithium strip was 7.5 cm long, 0.4 cm wide and 0.1 or 0.13 cm thick. As before, these fuel plates were discharged in tap water. In FIG. 7, the measured discharge voltage of four 0.1 cm thick strips is plotted against time for a typical experiment at 20°C and an external resistance of 7 ohms. Activation is seen to be very rapid, cut-off occurs more gradually due to slightly different consumption rates of the four lithium strips.

Polarization data of the above fuel plates are plotted in FIG. 8 in terms of potential vs current density and power density vs current density. The total cross-section area of the four lithium strips is taken as basis for these specific values.

Although the invention has been disclosed with reference to a lithium anode, it is to be understood that other alkali metals, such as sodium, are also envisaged. In addition, any metal that is corrosive in aqueous solutions of alkali metal hydroxide having a pH higher than 9 may be used.

Figure 9:
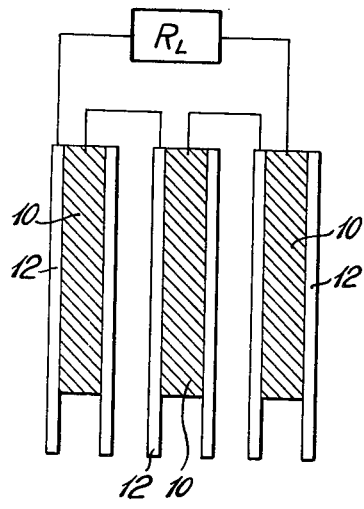
FIG. 9 illustrates a series connection of plural fuel elements.
Figure 10:
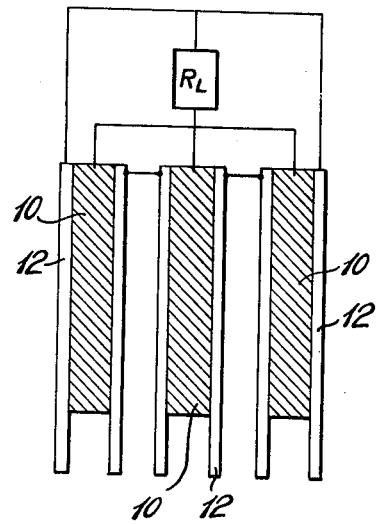
FIG. 10 illustrates a parallel connection of plural fuel elements.

Higher voltage requirement may be met by connecting a number of single fuel elements in series as illustrated in FIG. 9. Alternatively, the total current delivered may be increased by connecting a number of single fuel elements in parallel, as illustrated in FIG. 10.

What is claimed is:

1. A water-activated fuel element comprising:
   a. an alkali metal consumable anode;
   b. a consumable cathode of aluminum or aluminum alloys in intimate contact with at least a portion of the surface of said anode, said cathode corroding in aqueous solutions of alkali metal hydroxide of a pH higher than 9 which are formed by the electrochemical reaction of said alkali metal with water;
   c. an insulating layer separating said anode from said cathode along the contact area of anode and cathode and which is dissolved in aqueous solutions of said alkali metal hydroxide, said insulating layer being of a minimum thickness to insure intimate contact but no electrical short-circuit between said anode and cathode, and the thickness of said anode, cathode, and insulating layer being selected to assure constant mean rate of consumption of all parts of the fuel element as long as the element is in contact with water; and
   d. electrical connections to said anode and cathode for withdrawing electric energy from the fuel element.

2. A water activated fuel element as defined in claim 1, wherein said alkali metal anode is made of lithium.

3. A water activated fuel element as defined in claim 2, wherein said cathode is made of a layer of aluminum or aluminum alloy of predetermined thickness.

4. A water activated fuel element as defined in claim 3, wherein the thickness of the aluminum layer is in the range of 5 to 15 microns.

5. A water activated fuel element as defined in claim 3, wherein the thickness of the insulating layer varies between 50 A and 1 micron.

6. A water activated fuel element as defined in claim 3, wherein the insulating layer is the naturally formed oxide of aluminum.

7. A water activated fuel element as defined in claim 3, wherein the anode is in the shape of a cylindrical rod and surrounded by a cathode shell of corrosive material.

8. A water activated fuel element as defined in claim 3, wherein the anode is in the shape of a thin strip and surrounded by a cathode shell of corrosive material.

9. A water activated fuel element as defined in claim 3, wherein the anode is in the shape of a cylindrical rod having a cross sectional area in the range of 0.02 to 0.2 cm$^2$, and wherein the thickness of the aluminum material is in the range of 5 to 15 microns.

10. A water activated fuel element as defined in claim 3, wherein the anode is in the shape of a thin strip having a cross sectional area in the range of 0.02 to 0.2 cm$^2$, and wherein the thickness of the aluminum material is in the range of 5 to 15 microns.

11. A water activated fuel element as defined in claim 3, wherein the cathode is an integrated matrix of corrosive shell material forming a plurality of channels which are filled with alkali metal anode material.

12. A water activated fuel element as defined in claim 3, wherein the cathode is an integrated matrix of corrosive shell material forming a plurality of channels which are filled with alkali metal anode material, each channel having a cross-sectional area in the range of 0.02 to 0.2 cm$^2$.

13. A water activated fuel element as defined in claim 3, wherein the anode is in the shape of a hollow tube, the inside of the tube being cladded with a cathode shell, and the outside of the tube being covered with an insoluble insulating material.

14. A water activated fuel element as defined in claim 3, wherein the anode is in the shape of a hollow tube, the inside of the tube being cladded with a cathode shell and the outside of the tube being covered with an insoluble insulating material, said insoluble insulating material being metallized on the side facing the anode.

15. A water activated fuel element as defined in claim 3, wherein the anode is a plate, one side of which is cladded with a cathode shell and the other side covered with an insoluble insulating material.

16. A water activated fuel element as defined in claim 3, wherein the anode is a plate, one side of which is cladded with a cathode shell and the other side covered with an insoluble insulating material, said insoluble insulating material being metallized on the side facing the anode.

17. A water activated primary battery consisting of a plurality of fuel elements as defined in claim 3, said fuel elements being electrically connected in series, or in parallel, or both.

* * * * *